March 15, 1932.　　　　J. M. HOWE　　　　1,849,927
RADIO DIRECTION INDICATOR
Filed Feb. 15, 1926　　4 Sheets-Sheet 1

James M Howe — Inventor

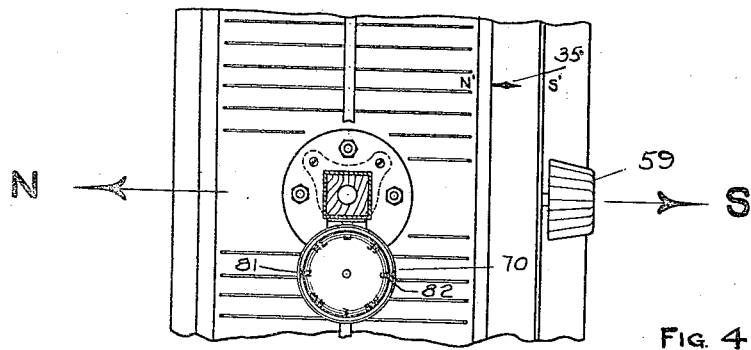
FIG. 4
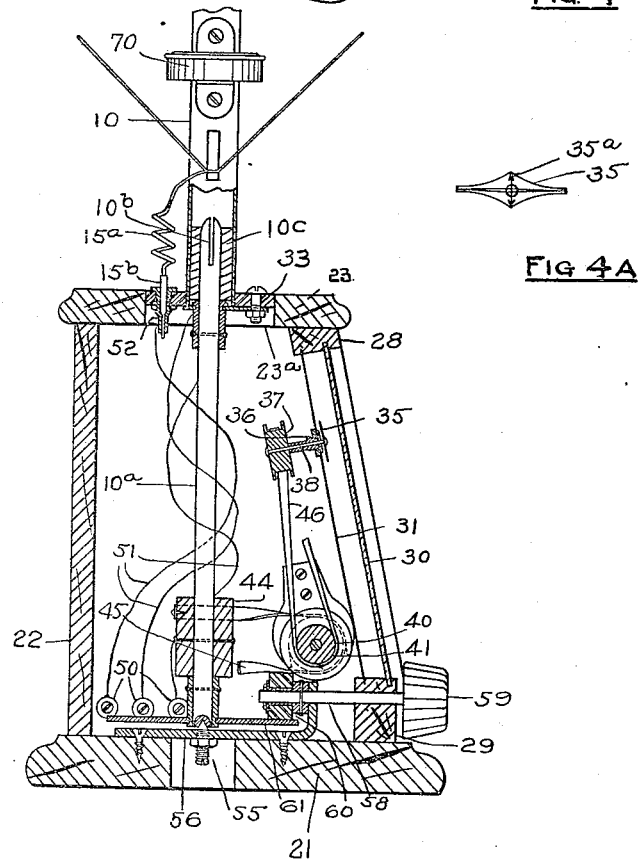
FIG. 4A
FIG. 3.

March 15, 1932.   J. M. HOWE   1,849,927
RADIO DIRECTION INDICATOR
Filed Feb. 15, 1926   4 Sheets-Sheet 3

James M Howe   Inventor

March 15, 1932.  J. M. HOWE  1,849,927
RADIO DIRECTION INDICATOR
Filed Feb. 15, 1926   4 Sheets-Sheet 4

James M Howe, Inventor

Patented Mar. 15, 1932

1,849,927

UNITED STATES PATENT OFFICE

JAMES M. HOWE, OF CLEVELAND HEIGHTS, OHIO

RADIO DIRECTION INDICATOR

Application filed February 15, 1926. Serial No. 88,441.

This invention is concerned with radio apparatus, and more particularly with direction indicators. The general object, thereof, is the provision of a direction indicator which is adaptable for use in combination with receiving or transmitting apparatus. More specifically, my invention has for its object the provision of direction indicating apparatus embodying novel operating features which will permit an accurate setting of a loop antenna to receive or transmit messages in a predetermined direction to or from any desired broadcasting station.

Other objects of my invention will hereinafter become apparent from the following description referring to accompanying drawings illustrating a preferred form thereof. The essential characteristics will be summarized in claim.

Figure 1:
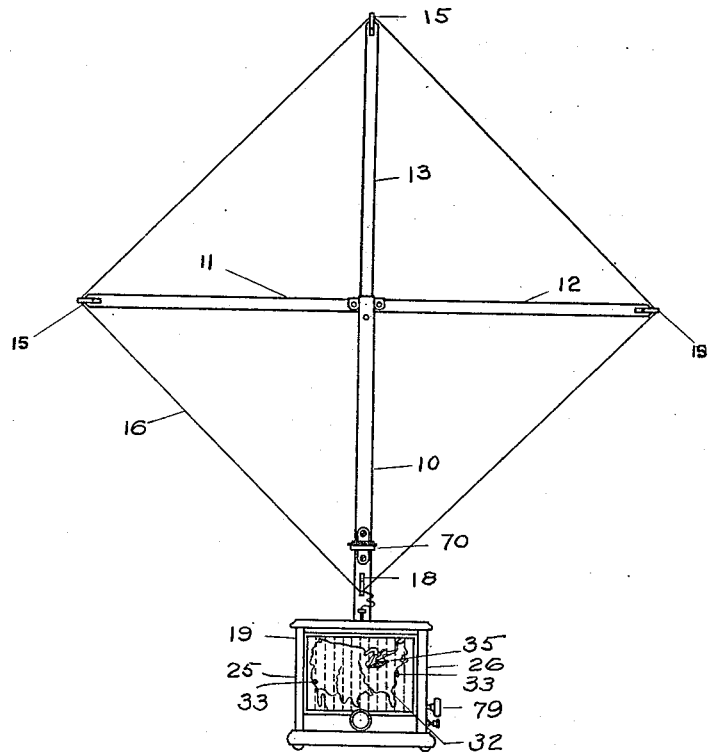
Figure 2:
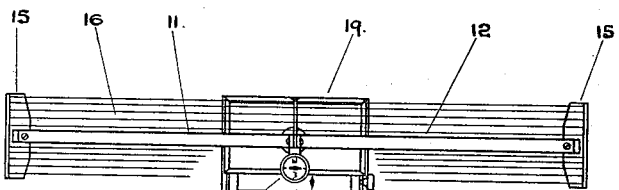
Figure 10:
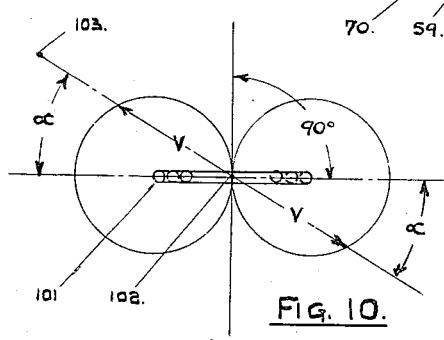
Figure 6:
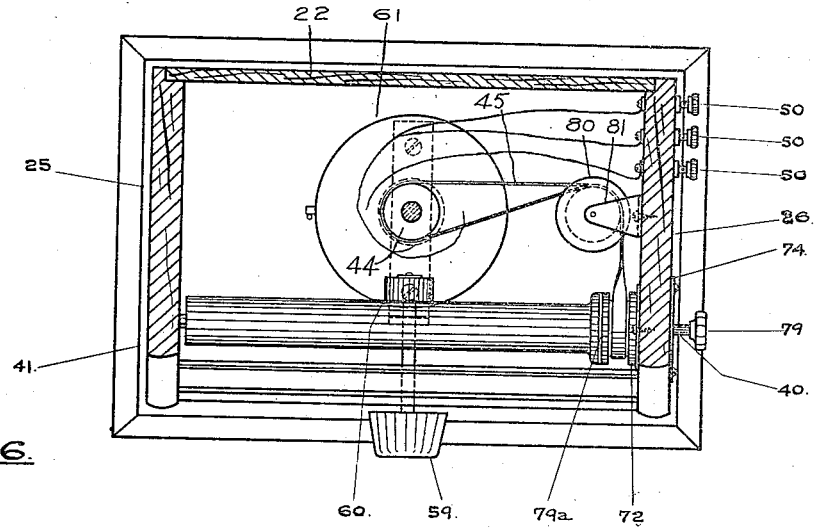
Figure 5:
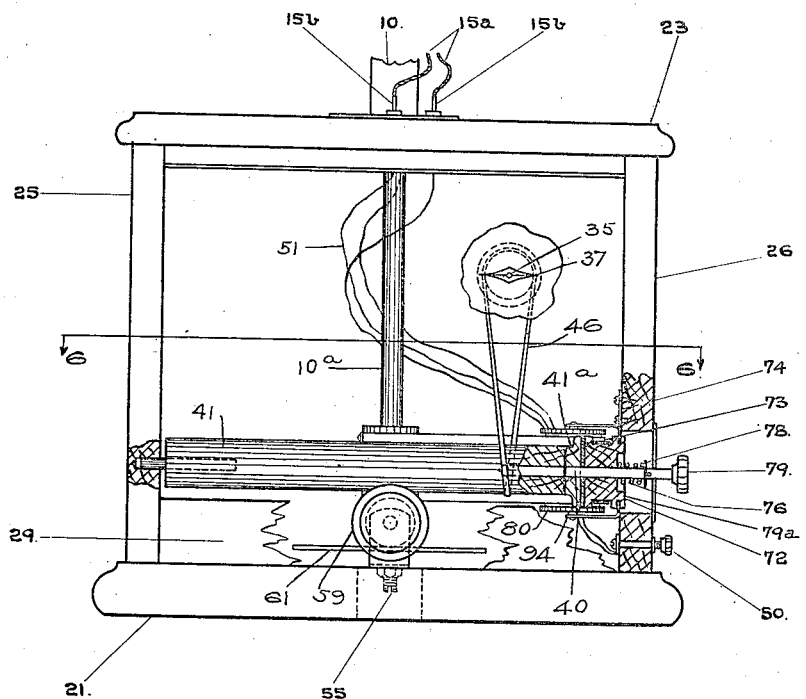
Figure 7:
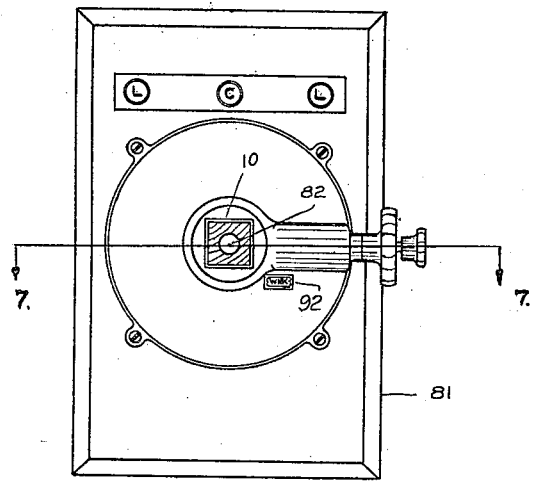
Figure 8:
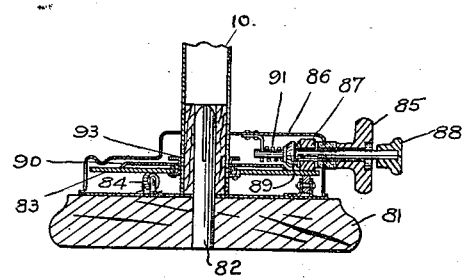
Figure 9:
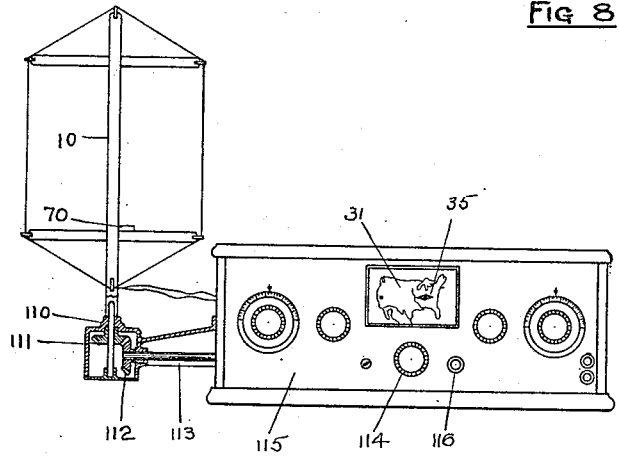

In the drawings, Figure 1 is a front elevation of a loop antenna constructed in accordance with the objects of my invention; Figure 2 is a top plan view of the same; Figure 3 is an enlarged cross sectional elevation of mechanism constituting the base of antenna; Figure 4 is an enlarged fragmentary view of the base of the antenna; Figure 4A is a detailed view of a compass pointer; Figure 5 is a front elevation of the base with the front panel of the base structure removed; Figure 6 is a cross sectional view of the base taken substantially along the line of 6—6 of Figure 5; Figure 7 is a plan view of a modified form of base; Figure 8 is a cross-sectional view of the base shown in Figure 7 taken along the line 7—7; Figure 9 is a front elevational view of another embodiment of my invention showing the apparatus combined with a radio receiving set; and Figure 10 is an efficiency diagram of a loop aerial.

The loop antenna has found exceptional favor with a large number of owners of radio receiving apparatus for the reason that it is more compact than an outside or permanently fixed aerial. It is well understood to those skilled in the art that when the axis of a loop is turned at right angles to a station broadcasting, or in other words, when the plane of the wires wound around the loop is pointed directly to sending station, the loop is in its most efficient position for receiving. Conversely, when the loop is turned at 90° from the above position, that is, when the loop axis is in line with the direction of the sending station and the plane of the wires at right angle to such direction, the energy received by the loop is extremely small or zero. This latter position is, consequently, the least efficient loop setting for receiving. Briefly, the directional theory of loop receiving efficiency is as follows: Referring to Figure 10, 101 represents a plan view of the conductors of loop and 102 represents the vertical axis about which the loop swings. Maximum signal intensity is obtained when the plane of the loop 101 is in line with the sending station. The efficiency of any loop position may be represented by vector "V", the base of which is at axis 102 of the loop and its length determined by its outer intersection with the circles. The angle alpha represents the number of degrees from which the loop deviates from the direct line to the sending station 103. It will be easily seen, therefore, that the length of vector is maximum as before mentioned when plane of the loop is in the directional line of the sending station and zero or at minimum when at 90° therefrom. It will also be noted that after once picking up station and after tuning in as loud as practical, then by tuning the loop then approximately 90° to the minimum or zero position of reception, the direction of station can be more accurately ascertained.

It has been observed that the average person operating a radio receiving set employing a loop aerial has little accurate conception of true direction, and the correct directional setting of the loop to date has been by the "listen and try again" method. My invention contemplates the provision of a novel means operatable in the light of the principle and in combination with the antenna staff and with a map or chart which will make it possible to accurately set the directional antenna to the maximum receiving position by setting a pointer on the chart to extend in the direction of the station or city from which it is desired to receive messages. I accomplished this by operatively connecting the antenna staff with a pointer whereby both may be simultaneously set by manipulating a control knob.

As shown in the drawings the antenna staff or center shaft 10 may have folding side arms 11 and 12 and a top arm 13 provided with plates 15, which serve to insulatingly support the aerial loop wires 16. A bottom plate 18, comprises the fourth corner of the loop support, and may be suitably mounted on the staff 10 immediately above a base cabinet, generally indicated at 19 in Figure 1. The staff 10 may be pivotally attached to the base in a manner to be hereinafter described.

The base cabinet may comprise as shown in Figures 3, 5 and 6 a bottom panel 21, a back panel 22, and a top and end panels 23, 25, and 26 respectively. The front of the cabinet may comprise an open frame structure formed by a top cross member 28 and a bottom cross member 29. The front portions of the end members are formed to slope from top to bottom, and the top panel 23 is correspondingly formed whereby a transparent front panel 30 may be mounted in the base to face upwardly at a slight angle. A map or chart 31, the characteristics of which will be later described may be mounted in parallel relation to panel 30. The map or chart panel 31 may be formed of any suitable material which will be rigid and which can receive a map or chart impression 32, (see Figure 1) to show the various broadcasting stations either by city indicia or by station letters and may be of such size, relative to cabinet dimensions, that direction pointer 35, (see Figures 1, 3, 4, 5) may be disposed at any locus on the map including the coastal stations indicated by dots 33 in Figure 1. The pointer may be carried by a small spindle 38, adjustably mounted in a sleeve bearing 36, which may be detachably fixed to the chart panel 31 in a suitable inconspicuous manner, as shown in Figure 3.

The pointer spindle 38, may be attached to the staff 10 by any suitable mechanism which will cause the pointer and staff to rotate in unison and this mechanism may be such that the pointer may be mounted on the map panel at the city, town or rural locus where the antenna is to be used. Such a mechanism may comprise a shaft 40 suitably connected to rotate and be supported by end panels 25 and 26. This shaft is preferably disposed horizontally relative to the antenna staff 10 and may be provided with a pulley 41 extending substantially the length of the map panel. A pulley 44 may be mounted on the lower end of staff 10a and a flexible band 45 may serve to drivingly connect the staff and shaft in a manner to be hereinafter described. A similar flexible band 46 extends over the pulley 41 and the pulley 37 fixed to the inner end of the pointer spindle 38. Hence when the staff 10a is turned, the pointer 35 is turned in unison therewith through a corresponding number of degrees.

An electric coupling means affording aerial connection to a radio receiving set may comprise any suitable conductor means associated with the staff and base.

As shown in Figure 3, I provide a bearing mounting for the staff of such character that the loop terminals may be permanently attached to base as shown at 50. Extending upwardly from the terminals 50 are wires 51 which extend to socket terminals 52 carried by a bearing disc 53 made of insulating material. The disc 53 bears on the annular wall of an opening 23a formed in the top panel member 23 and is secured to the lower part 10a of the staff. This lower part of staff extends upwardly and above the top surface of the panel 23 to afford detachable connection to the removable upper part of staff. The staff 10 may be square and extend into a square hole formed in the insulating disc 53 and the upper portion 10b of the staff 10a is loosely fitted in a bushing 10c, secured in the end of the staff 10, thus steadying the construction. The ends 15a of the loop wires are provided with plug connectors 15b to afford ready attachment and detachment to and from the sockets of the lead wires 51. The lower end of staff member 10a is provided with a bearing in the form of an adjustable pivot screw 55. The pivot screw may be carried by a plate 56 which also serves as a bearing member for the inner end of a manually operated stub shaft 58. The stub shaft extends exteriorly of the front panel of the base and has mounted on an outer end thereof, a knob 59, and at its inner end a rubber wheel 60 which contacts with and operates a disc member 61 rigidly fastened to lower end of staff member 10a.

As has been hereinbefore stated, the map or plat panel 31 is preferably laid out in a projection which always gives a true relation of the pointer to the loop position. Geographically arranged thereon, are the broadcasting stations which may be designated by either city locus or by station insignia, and the pointer 35, is mounted on a panel at the geographical locus of the aerial. However, it is essential that the pointer 35 bears a given relation to the axis of the loop, depending on the directional position chosen for the cabinet and the map, so that when the loop is turned to the true north and south direction the hand 35 will point north and south on the map. Consequently, a compass 70 is rigidly mounted to the staff 10 to facilitate this setting. This compass is preferably of the floating dial type and two lubber points 81 and 82 Figure 4 are provided on the stationary compass case; these pointers being accurately alined parallel with the plane of loop wires, and consequently, at exactly 90 degrees to the axis of loop. To set the loop to the true magnetic north, that is, the axis of loop at 90° or directly east and west, the loop may be turned until the lubber points 81 and 82, coincide with north and south pointers on the floating compass dial. It will be seen that it makes no difference which of the two corners of the loop point to the north.

The driving connection between the pointer and staff which includes the flexible band 45 includes a clutch or similar mechanism which will permit relative adjustment between pointer and staff after the aerial loop wires have been set to a true north and south position and this clutch mechanism (see Figures 5 and 6) may be as follows: Mounted loosely within the base structure upon the shaft 40 may be a loose pulley 72. The pulley 72 has a groove 73 in which bears a plate 74 secured to the inner side of end panel 26. Engaging the outer end of the pulley 72 is a compressed spring 76, which is mounted upon the shaft 40 to thrust against a washer 78 secured to shaft. The inner end of the pulley is provided with a friction disc 79a which engages the juxtaposed end 41a of the pulley 41. The belt 45 extends from the shaft pulley 44 to one end of the base and over two intermediate separate pulleys 80 mounted on a common shaft (see Figure 6.) These pulleys are carried by a suitably formed bracket 81 secured to an end panel in such a position as to properly guide the belt 45 over the pulleys 44 and 72 respectively. It will thus be seen that by forcing the shaft 40 slightly inwardly to overcome the influence of spring 76, that is, by thrusting and turning the knob 79 the shaft 40, the pointer 35 may be turned to any desired position relative to the map without disturbing the directional setting of the loop. Consequently, the loop may therefore, by means of compass 70 and lubber points 81 and 82, be set directly north and south and by turning the knob 79 and pointer 35 to set it parallel to the nearest meridian line, gives the pointer a north and south setting relative to the map. It is evident that as long as the position of the cabinet is not changed relative to north and south, that the pointer (relative to map) will indicate the true direction of the loop. Correspondingly, therefore, should the pointer by means of knob 59 be turned to a certain city, the direction and position of which is indicated on the map, the loop will be turned in the actual direction of this city from the geographical locus of the receiving set.

As previously explained, the maximum receiving direction of the loop is when the plane of the wires extends in the direction of the sending station. This is the loop's actual direction, therefore, for receiving the maximum electric signals.

The enlarged view of the pointer 35 (see Figure 4A) shows a line 35a at 90° to the long axis for determining the exact direction of an unknown sending station. If the signal is sufficiently loud, then by turning the loop by means of the knob 59 until the signal is lost, it will be apparent that 90° from this position is the accurate direction of the sending station.

From the foregoing description of my invention it will be apparent that it may be embodied in a variation of aerial base structures employing a map or broadcasting plat. It will also be apparent that the device described is readily adaptable to use at any locus by positioning the pointer shaft at the geographical point of the aerial's use. Likewise, if it were desired to incorporate the aerial staff control with one of the controls of a receiving set where the latter is adjusted to receive messages of a known wave length, the aerial would be directionally positioned to receive messages from the geographical locus of the station which is broadcasting messages of such wave length. If desired, the map or plat may be disposed in a horizontal plane with the staff antenna passing thru the geographical locus of the aerial's use.

In this form of my invention the pointer or its equivalent would be adjustably mounted directly on the staff, all of which I consider to be within the scope of my invention. Furthermore, the map, the pointer and the loop and the pointer actuating control may be incorporated directly in a cabinet or radio set as indicated in Figure 9, the loop being mounted as shown or else mounted so as to project through the upper portion of the cabinet. It will be noted that an apparatus may be built where a map in the true sense of the word is not necessary but from a given locus, the relative angles or position of the various cities laid out from this as a center will serve instead, the actual locus of receiving set being the geographical center around which the various cities are laid at corresponding angles as determined from a map representing the actual locus of the loop to the actual position of the cities. Such an apparatus is shown in Figure 8. The aerial staff 10 is mounted on a base 81. Rigidly fastened in this base is a steadying shaft 82 about which the loop may be rotated. A driving plate 83 having a square hole in which the staff 10 fits, is supported on three rollers 84. The large knob 85 is properly supported in the casing 86 and is provided with a rubber roller 87 at its inner end and resting against the plate 83 is provided a simple means of rotating the loop. A small knob 88 and shaft journalled inside the large knob 85, as shown with a small rubber friction wheel 89 is secured to the shaft and is held away from contact with an indicating disc 90 by means of a spring 91. The indicating disc 90 has on its surface, as illustrated at 92, the call letters of stations spaced so as to be visible through slots in the actual angular relation that the geographical locus of aerial has to the broadcasting stations. It may readily be seen that this indicating disc thereby takes the place of a map or plat as previously disclosed and will serve as well in this form of apparatus.

The indicating disc 90 is frictionally held against the circular plate 83 by means of a small spring 93. The aerial is provided with compass and lubber points exactly the same as illustrated in Figures 1, 2, 3 and 4. To set the indicating disc 90 in correct relation to the loop, by means of knob 85, the loop is rotated to the direct north and south as previously described. By pressing the small knob 88 inwardly so that the friction wheel 89 makes contact with the indicating disc 90, the indicating disc can be rotated relative to the loop and driving disc 83 until the lettering north appears underneath the observation slot 92; this lettering north, bearing to the call letters of the stations, the same actual relation that the magnetic north bears to the actual cities or stations. Consequently, after the loop is set true north and south and after the indicating disc 90, considering the permanent location of the base, 81, is brought into proper angular relation, the spring 91 throws the adjusting friction disc out of engagement. The loop now may be rotated by the knob 85 until the desired station lettering appears in the observation slot. The loop then correctly points geographically to the actual station, the indicating disc 90 being retained against the driving disc 83 by spring 93.

In Figure 9, I show the loop aerial supported on a bracket 110 attached to the cabinet 115 of a radio receiving set, the map 31 and pointer 35 being arranged on the dial panel of the set. Suitable mechanism may operatively connect the pointer and a shaft 113 with an operating knob 114 attached to the dial panel. Bevel gearing 111, 112 may serve to connect the aerial staff 10 with the knob. The mode of setting by the knob 116, this modified form of my invention would be as hereinbefore described.

I claim:

In an apparatus of the character described, the combination of a loop aerial having a pivotally supported staff, a supporting base including spaced apart bearings for the aerial, a map mounted on the base and having broadcasting stations geographically located thereon, a pointer carried by a staff positioned on the map at the geographic locus of the aerial, a belt connecting the aerial staff and pointer staff and means for manually setting the pointer to a selected broadcasting station and means for effecting relative adjustment between the pointer and aerial staff.

In testimony whereof I hereunto affix my signature.

JAMES M. HOWE.